United States Patent
En Lin et al.

(10) Patent No.: US 7,315,682 B1
(45) Date of Patent: Jan. 1, 2008

(54) FIBER OPTIC PROTECTIVE SHUTTER

(75) Inventors: Samuel I. En Lin, Chu-Nan Town (TW); Stephen O'Riorden, Stow, MA (US)

(73) Assignee: Senko Advanced Components, Inc., Marlboro, MA (US)

( * ) Notice: Subject to any disclaimer, the term of this patent is extended or adjusted under 35 U.S.C. 154(b) by 0 days.

(21) Appl. No.: 11/508,446

(22) Filed: Aug. 22, 2006

(51) Int. Cl.
*G02B 6/00* (2006.01)
*G02B 6/38* (2006.01)

(52) U.S. Cl. .......................... 385/139; 385/53; 385/55; 385/56; 385/58; 385/60; 385/70; 385/72; 385/75

(58) Field of Classification Search .................. 385/139
See application file for complete search history.

(56) References Cited

U.S. PATENT DOCUMENTS

| | | | |
|---|---|---|---|
| 5,348,487 A | * | 9/1994 | Marazzi et al. ............. 439/138 |
| 5,506,922 A | | 4/1996 | Grois et al. .................... 385/75 |
| 5,570,445 A | * | 10/1996 | Chou et al. ................... 385/92 |
| 5,687,268 A | * | 11/1997 | Stephenson et al. .......... 385/73 |
| 5,956,444 A | | 9/1999 | Duda et al. .................... 385/53 |
| 6,206,577 B1 | | 3/2001 | Hall, III et al. ............... 385/53 |
| 6,247,849 B1 | | 6/2001 | Liu ............................. 385/55 |

* cited by examiner

*Primary Examiner*—Frank G. Font
*Assistant Examiner*—Ryan Lepisto
(74) *Attorney, Agent, or Firm*—Pepper Hamilton LLP

(57) ABSTRACT

A protection system for a fiber optic coupling having a first housing with a guide slot in a side wall includes a protective cap with a slot in a side wall and defining a passage for receiving the first housing whereby the protective cap slot aligns with the guide slot in the first housing and a protective shutter pivotally connected to the protective cap for covering a distal end and guide slot of the fiber optic coupling.

4 Claims, 2 Drawing Sheets

FIBER OPTIC PROTECTIVE SHUTTER

BACKGROUND OF THE INVENTION

In the optical fiber field, light-guide fibers are used in optical transmission systems wherein the fibers are connected end-to-end to transfer light or optical energy. Often, fiber ends may be damaged by adverse environmental hazards, particularly at the location where optical fibers terminate in connectors. In particular, dust, dirt, and debris may impair the optical transmission capabilities of the fiber. Also, since a laser beam passes through the fiber, an operator's eyes may easily be injured while the connector is not in use or is not covered. Hence, the mating end of a fiber connector is often covered when not in use or not connected.

SUMMARY OF THE INVENTION

In general, in an aspect, the invention is directed to a protection system for a fiber optic coupling, the fiber optic coupling having a first housing with a guide slot in a side wall. The system includes a protective cap including a slot in a side wall and defining a passage for receiving the first housing whereby the protective cap slot aligns with the guide slot in the first housing, and a protective shutter pivotally connected to the protective cap for covering a distal end and guide slot of the fiber optic coupling. The protective shutter can be configured to attenuate electromagnetic radiation in at least one of the near infrared range or the infrared range.

In general, in another aspect, the invention is directed to a protective shutter for a fiber optic coupler to prevent dust and other contaminants from entering the coupler. The shutter includes a protective cap configured to protect fibers in a fiber optic connection, and a lid pivotally connected to a protective cap, wherein the lid includes a side portion that covers a guide slot in the fiber coupler when closed. The protective shutter can be configured to attenuate electromagnetic radiation in at least one of the near infrared range or the infrared range.

Various aspects of the invention may provide one or more of the following capabilities. A protective shutter for a fiber optic connector that attenuates electromagnetic radiation and prevents dust and other contaminants from entering the connector may be provided. Foreign matter is substantially prevented from entering the housing. Guiding slots in the walls of the connector are covered. Ease of disassembly of the protective cap from a coupler is improved.

These and other capabilities of the invention, along with the invention itself, will be more fully understood after a review of the following figures, detailed description, and claims.

DETAILED DESCRIPTION OF PREFERRED EMBODIMENTS

Embodiments of the invention provide techniques for protecting a fiber optic coupler from contamination by dust, debris or other environmental hazards. Exemplary embodiments of the invention include a protective cap and a protective shutter. The protective cap includes an open slot in the side that aligns with a guiding slot in the fiber coupler. The movable shutter includes a side portion that when closed, covers the open slot in the protective cap and coupler, thereby preventing contamination from entering the coupler. The open slot in the side of the cap allows the user to remove the cap after it has been placed on the fiber coupler. The cap is slid off the coupler by inserting a tool in the slot and prying apart. Other embodiments are within the scope of the invention.

Figure 1:
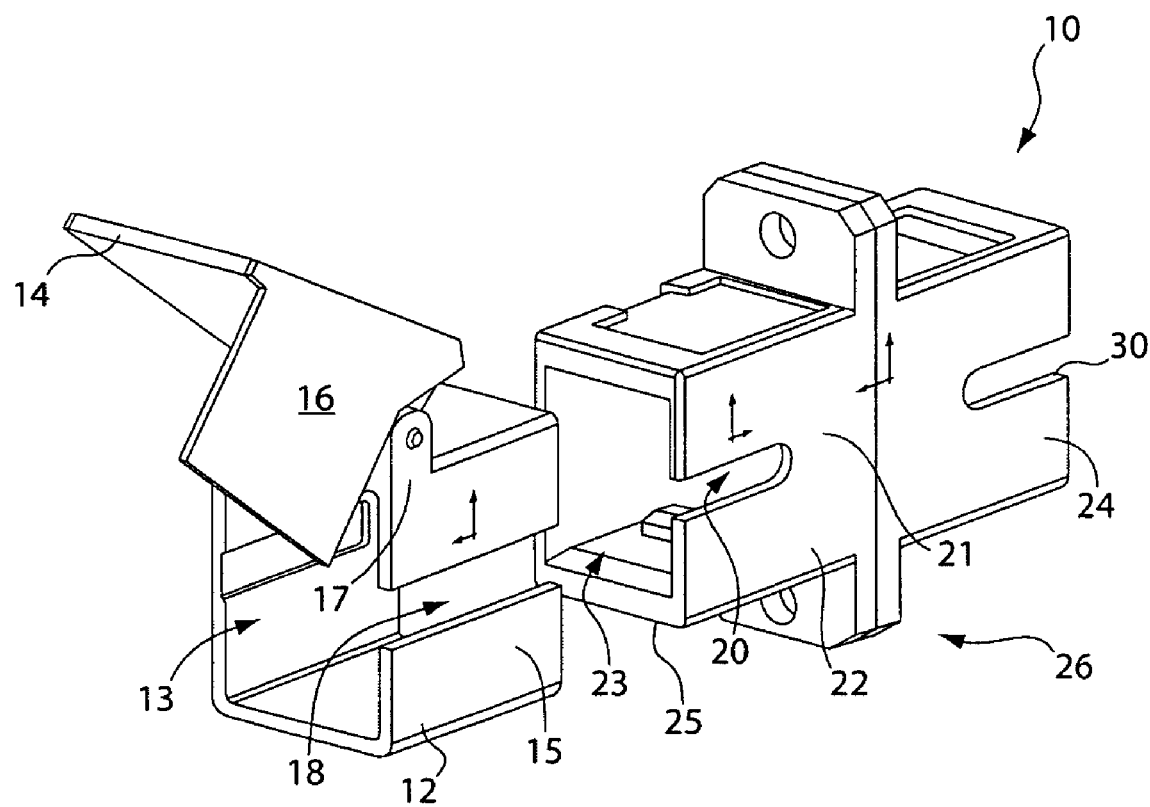
FIG. 1 is an exploded, perspective view of a protection cap and fiber coupler.

Referring to FIG. 1, a fiber optic coupling protection system 10 includes a protective cap 12 and a fiber coupler 26. The protective cap 12 includes a protective shutter 14, a side portion or lip 16 of the protective shutter 14, and an opening 18. The opening 18 is positioned on a side 15 of the protective cap 12. The opening 18 can be, for example, positioned along a horizontal width of the protective cap 12, substantially midway between the top and bottom edges of the protective cap 12. The opening 18 substantially aligns with a guiding slot 20 in a housing 22 of the fiber coupler 26 (see FIG. 2 and accompanying description). The protective shutter 14 is connected to the protective cap 12.

The protective shutter 14 having the lip 16 covers the opening 18 in the side of the protective cap 12 when the shutter 14 is in a closed position. The protective shutter 14 is pivotally connected to the protective cap 12. The pivot connection, for example, is located on a distal end 17 of the protective cap 12. The protective shutter 14 pivots about the axis of the pivot connection from an open position to a closed position, in which the protective shutter 14 covers the passage 13 and the opening 18 of the protective cap 12. The protective shutter 14 is configured to pivot to an open position in which the passage 13 and the opening 18 of the protective cap 12 are not covered. In an alternative embodiment, the protective shutter 14 is connected to the protective cap 12 via a horizontal or vertical slide movable connection. Other known means of connection are possible.

The protective shutter 14 is made of a material that attenuates electromagnetic radiation in the near IR and IR range. Conventional plastics used for protective caps may attenuate electromagnetic radiation (EM) in the visible range but may not attenuate EM in the IR and Near IR range (e.g., in the range of approximately 780 nm to 3000 nm). This near IR and IR EM cannot be seen by the human eye, but can still do considerable damage. Therefore, attenuation in this range can be crucial to true eye safety. The material properties of the cap are such that the polymers either provide adequate attenuation of electromagnetic radiation or the polymers are mixed with a material that will scatter and/or attenuate any potential radiation emitted from a "live" connector plugged into the second housing 24. Such materials, for example, may include but are not limited to 30% glass filled Polyethylene Terephthalate (PET), thermoplastics with modest levels of carbon black filler, or various Near Infrared (NIR) absorbers that are made of highly absorbent, non-reflecting material. The emitted radiation can be reduced to a level lower than the Maximum Permissible Exposure (MPE) limits for biological effects so as to limit any ocular damage that may otherwise occur while using a shutter with poor attenuation properties.

The fiber coupler 26 includes a first housing 22 and a second housing 24. The first housing 22 defines a receiving recess 23 having a front edge 25 and a guide slot 20. The guide slot 20 is positioned in a side wall 21 of the first housing 22. The recess 23 comprises a center bore, or axial passageway through the first housing 22 and the second housing 24. The receiving recess 23 optically connects a fiber bundle.

The second housing 24 includes a guiding slot 30. The second housing 24 defines a portion of the receiving recess 23. The guiding slot 30 is positioned in a side wall of the second housing 24. The second housing 24 can be, for example, a mirror image of the first housing 22.

The housing 22 of the fiber coupler 26 is inserted into the passage 13 of the protective cap 12. The protective cap 12 slides over the first housing 22, with the first housing 22 inserting axially in the passage 13. The first housing 22 is inserted into the protective cap 12 on a side opposite the distal end 17 of the protective cap to which the protective shutter 14 is attached. The first housing 22 is inserted into the protective cap 12 in an orientation such that the opening 18 of the protective cap 12 substantially aligns with the guide slot 20 in the housing 22. The protective cap 12 remains in place over the first housing 22 through the use of contact friction and/or the use of snap tabs and recesses molded into the protective cap 12 and first housing 22 respectively. Other known means of retaining the housing 22 in the cap 12 are possible and envisioned.

Figure 2:
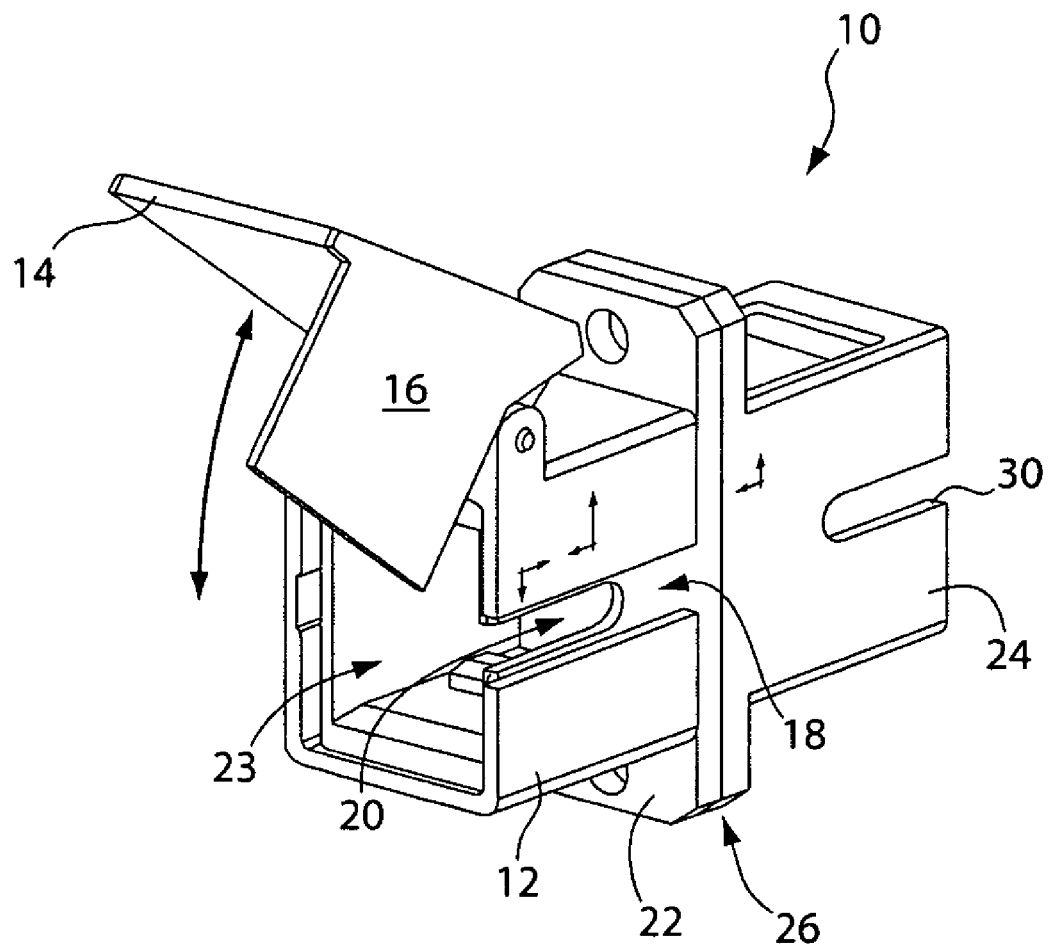
FIG. 2 is an assembled, perspective view of a fiber coupler on which the protection cap is mounted.

Referring also to FIG. 2, the fiber optic coupling protection system 10 is assembled axially over the first housing 22 of the fiber coupler 26. When the system 10 is assembled over the first housing 22 of the fiber coupler 26, the guide slot 20 and the receiving recess 23 are covered by the protective shutter 14 and the side portion 16.

The shutter 14 can be opened for insertion of a fiber connector into the receiving recess 23. The protective shutter 14 is pivoted to an open position about the pivot connection which is connected to the distal end 17 of the protective cap 12 and to the top edge of the shutter, until the protective shutter 14 no longer obstructs the receiving recess 23 and the guide slot 20. If the fiber connector is removed, the protective shutter 14 resumes its closed position in which the shutter 14 covers the receiving recess 23 and the guide slot 20 by pivoting about the pivot connection. The force required to pivot the protective shutter 14 to a closed position may be generated from many various sources, such as a spring attached to the pivot connection and configured to return the protective shutter 14 to the closed position, for example. The open slot 18 in the side of the cap 12 allows the user to remove the cap 12 when it is positioned on the fiber coupler 26. The cap 12 is easily slid off the coupler 26 by inserting a tool in the slot and prying apart. Thus, the defects of a conventional protective cap are overcome while providing protection from environmental hazards.

The system 10, is exemplary only and not limiting as other system configurations can be used with embodiments of the invention. Other embodiments are within the scope and spirit of the appended claims. Features implementing functions may also be physically located at various positions, including being distributed such that portions of functions are implemented at different physical locations.

Further, while the description above refers to the invention, more than one invention may be described.

What is claimed is:

1. A protection system for a fiber optic coupling, the fiber optic coupling having a first housing with a guide slot in a side wall, the system comprising:
   a protective cap including a slot in a side wall and defining a passage for receiving the first housing whereby the protective cap slot aligns with the guide slot in the first housing; and
   a protective shutter pivotally connected to the protective cap, the protective shutter configured to cover a distal end of the first housing and the guide slot of the first housing.

2. The protection system of claim 1 wherein the protective shutter is configured to attenuate electromagnetic radiation in at least one of the near infrared range or the infrared range.

3. A protective shutter for a fiber optic coupler to prevent dust and other contaminants from entering the coupler, the shutter comprising:
   a protective cap configured to protect fibers in a fiber optic connection; and
   a lid pivotally connected to the protective cap, wherein the lid includes a side cover transverse to the lid that is configured to cover a guide slot in the fiber optic coupler when closed.

4. The protection system of claim 3 wherein the protective shutter is configured to attenuate electromagnetic radiation in at least one of the near infrared range or the infrared range.

* * * * *